(12) United States Patent
Park et al.

(10) Patent No.: US 8,560,122 B2
(45) Date of Patent: Oct. 15, 2013

(54) TEACHING AND PLAYBACK METHOD BASED ON CONTROL OF REDUNDANCY RESOLUTION FOR ROBOT AND COMPUTER-READABLE MEDIUM CONTROLLING THE SAME

(75) Inventors: Dae Hyung Park, Koyang (KR); Ki Moon Lee, Yongin-si (KR); Chi Gun An, Suwon-si (KR); Yong Joon Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 436 days.

(21) Appl. No.: 12/923,650

(22) Filed: Sep. 30, 2010

(65) Prior Publication Data
US 2011/0093119 A1    Apr. 21, 2011

(30) Foreign Application Priority Data
Oct. 16, 2009    (KR) .................. 10-2009-0099003

(51) Int. Cl.
  *G05B 19/04*    (2006.01)
  *G05B 19/18*    (2006.01)
(52) U.S. Cl.
  USPC .............. 700/262; 700/251; 700/252; 901/3; 901/15; 901/16; 901/50

(58) Field of Classification Search
  None
  See application file for complete search history.

(56) References Cited

U.S. PATENT DOCUMENTS

| | | | | |
|---|---|---|---|---|
| 4,887,222 A | * | 12/1989 | Miyake et al. | 700/262 |
| 4,931,549 A | * | 6/1990 | Berner | 534/557 |
| 4,967,126 A | * | 10/1990 | Gretz et al. | 318/568.19 |
| 4,975,856 A | * | 12/1990 | Vold et al. | 700/263 |
| 5,737,500 A | * | 4/1998 | Seraji et al. | 700/251 |
| 6,489,741 B1 | * | 12/2002 | Genov et al. | 318/561 |
| 6,845,295 B2 | * | 1/2005 | Cheng et al. | 700/245 |
| 7,756,606 B2 | * | 7/2010 | Nakajima et al. | 700/245 |
| 7,904,202 B2 | * | 3/2011 | Hoppe | 700/245 |
| 8,145,355 B2 | * | 3/2012 | Danko | 700/251 |

* cited by examiner

*Primary Examiner* — Khoi Tran
*Assistant Examiner* — Bao Long T Nguyen
(74) *Attorney, Agent, or Firm* — Staas & Halsey LLP (57) ABSTRACT

Disclosed is a teaching and playback method using a redundancy resolution parameter determined in conjunction with a joint structure, for a robot, and a method to apply analytic inverse kinematics to a robot having an elbow with an offset and a computer-readable medium of controlling the same. A reference plane variable with the joint structure is generated and an angle between the reference plane and an arm plane of the robot is used as the redundancy resolution parameter. The robot is taught and its operation is played back in differential inverse kinematics or analytic inverse kinematics using the resolution redundancy parameter.

14 Claims, 6 Drawing Sheets

|   | $\alpha_i$ | $a_i$ | $\Theta_i$ | $d_i$ |
|---|---|---|---|---|
| 1 | 0 | 0 | $\Theta_1$ | $d_{BS}$ |
| 2 | $-\pi/2$ | 0 | $\Theta_2$ | 0 |
| 3 | $\pi/2$ | 0 | $\Theta_3$ | $d_{SEI}$ |
| 4 | $-\pi/2$ | $a_E$ | $\Theta_4$ | 0 |
| 5 | $\pi/2$ | $-a_E$ | $\Theta_5$ | $d_{E2W}$ |
| 6 | $-\pi/2$ | 0 | $\Theta_6$ | 0 |
| 7 | $\pi/2$ | 0 | $\Theta_7$ | $d_{WT}$ |

D-H CONVENTION PARAMETERS

FIG. 6

# TEACHING AND PLAYBACK METHOD BASED ON CONTROL OF REDUNDANCY RESOLUTION FOR ROBOT AND COMPUTER-READABLE MEDIUM CONTROLLING THE SAME

CROSS-REFERENCE TO RELATED APPLICATIONS

This application claims the benefit of Korean Patent Application No. 2009-0099003, filed on Oct. 16, 2009 in the Korean Intellectual Property Office, the disclosure of which is incorporated herein by reference.

BACKGROUND

1. Field

Example embodiments relate to a teaching and playback method for a robot having at least one redundancy resolution, particularly a robot with an elbow having an offset, using a redundancy resolution parameter determined in conjunction with a joint structure.

2. Description of the Related Art

A teaching and playback algorithm based on Inverse Kinematics (IK) is used for control of an industrial robot. A robot arm such as a 7-axis manipulator has recently emerged to mimic the natural movement of the human arm.

In general, differential IK and analytical IK are used as IK. It is known that analytical IK is restrictively applicable to a Spherical-Regulated-Spherical (S-R-S) manipulator which allows for geometric and algebraic analyses.

There are basically six coordinate system parameters for an end-effector of a robot, and one or more redundancy resolution parameters are defined for posture control. An arm angle is used as a redundancy resolution parameter. The arm angle is defined as an angle between a reference plane formed by a reference vector and a shoulder and wrist of the robot and an arm plane formed by the shoulder, elbow, and wrist of the robot.

In differential IK, the arm angle is used for Extended Jacobian as a parameter of a cost function, whereas in analytical IK, the arm angle is used as a parameter of operational space.

Even though the robot has the coordinate system parameters for the end-effector and seven teaching values as arm angles, one arm angle may represent two shoulder postures at the same time. Therefore, there is a limit on the playback function of the robot to return to the same position and posture all the time.

SUMMARY

Therefore, it is an aspect of the example embodiments to provide a teaching and playback method using a redundancy resolution parameter determined in conjunction with a joint structure for a robot having at least one redundancy resolution.

It is another aspect of the example embodiments to provide a method to apply analytic Inverse Kinematics (IK) to a robot with an elbow having an offset.

The foregoing and/or other aspects are achieved by providing a teaching and playback method for a robot including performing a teaching and playback operation based on inverse kinetics for the robot, for posture control, in operational space, by calculating joint angles of the robot in joint space using end-effector parameters and a redundancy resolution parameter of the robot. The redundancy resolution parameter is determined in conjunction with a joint structure of the robot.

The redundancy resolution parameter may be an arm angle which is an angle between a set reference plane and an arm plane formed by a shoulder, elbow, and wrist of the robot.

The robot may include a Spherical-Regulated-Spherical (S-R-S) manipulator having an elbow without an offset or a Spherical-Articulated-Spherical (S-A-S) manipulator having an elbow with an offset.

The teaching and playback method may further include determining whether a posture of the robot is one of a positive and negative by comparing a set angle with an angle $\theta_S$ between a second joint axis of the robot and a vector obtained by projecting a vector directed from the shoulder to the wrist of the robot on an X-Y plane of a first joint coordinate system based on Denavit-Hartenberg (D-H) convention parameters. If the angle $\theta_S$ is between 0 and 180 degrees, the posture of the robot may be determined to be positive, and if the angle $\theta_S$ is below 0 or above 180 degrees, the posture of the robot may be determined to be negative.

The reference plane may be one of a positive reference plane and a negative reference plane according to a posture of the robot. The positive reference plane may be generated to be a plane formed by the shoulder and the wrist of the robot and a first reference vector which is a cross product between the vector directed from the shoulder to wrist of the robot and an axial-direction vector of the second joint axis of the robot, when the posture of the robot is positive, and the negative reference plane may be generated to be a plane formed by the shoulder and wrist of the robot and a second reference vector which is a cross product between the axial-direction vector of the second joint axis of the robot and the vector directed from the shoulder to the wrist of the robot, when the posture of the robot is negative.

The arm angle and a type of the reference plane may be represented in one parameter by setting the arm angle to range from 0 to 360 degrees and assigning a sign indicating one of the positive and negative reference plane.

Information indicating whether the reference plane is one of the positive and negative plane may be stored as a parameter.

The inverse kinematics may be differential or analytic inverse kinematics. The teaching and playback operation may be performed in the analytic inverse kinematics by setting a center of a fourth axis of the robot as an elbow, generating two virtual elbows based on Denavit-Hartenberg (D-H) convention parameters, and interpreting an initial posture of the robot and a target posture that results from moving the arm plane by a predetermined angle, using the elbow and the virtual elbows.

The foregoing and/or other aspects are achieved by providing a teaching and playback method for a robot having an elbow with an offset includes performing a teaching and playback operation based on analytic inverse kinetics for the robot for posture control, using end-effector parameters and a redundancy resolution parameter of the robot. The teaching and playback operation may be performed by setting a center of a fourth axis of the robot as an elbow, generating two virtual elbows based on Denavit-Hartenberg (D-H) convention parameters, and interpreting an initial posture of the robot and a target posture that results from moving a set reference plane and an arm plane defined by a shoulder, elbow, and wrist of the robot by a predetermined angle, using the elbow and the virtual elbows.

The redundancy resolution parameter may be determined in conjunction with a joint structure of the robot.

The redundancy resolution parameter may be an arm angle which is an angle between the set reference plane and the arm plane.

According to another aspect of one or more embodiments, there is provided at least one computer readable medium including computer readable instructions that control at least one processor to implement methods of one or more embodiments.

Additional aspects of the example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
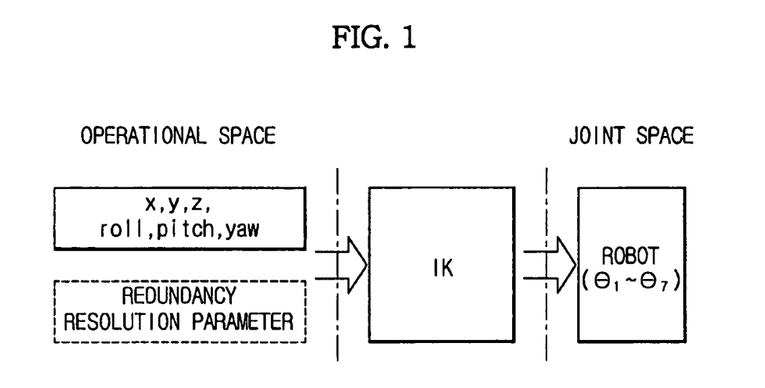
FIG. 1 illustrates an overall control method for a 7-axis robot according to example embodiments.

FIG. 1 illustrates an overall control method for a 7-axis robot according to example embodiments. Six coordinates (i.e. x, y, z, roll, pitch and yaw) as end-effector parameters of a robot and at least one redundancy resolution parameter exist in operational space. Among the end-effector parameters of the robot, x, y and z are three-dimensional position coordinates and roll, pitch and yaw are rotation angles with respect to x-, y-, and z-axis directions, respectively. The redundancy resolution parameter is an arm angle which will be described later.

Target values of the above-described parameters are set for the robot and a time-dependent trajectory is planned from a current state to a target state. In IK, the planned parameters are converted to joint values of the robot in joint space and a torque value is calculated using the joint values and input to each motor of the robot.

Figure 2:
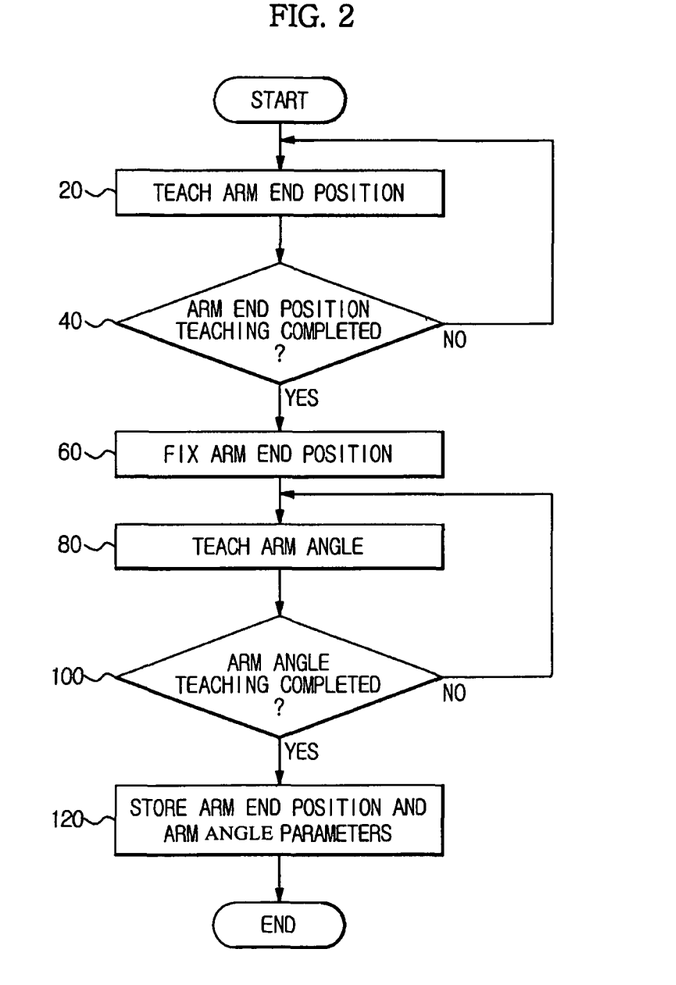
FIG. 2 is a flowchart illustrating a method of teaching the 7-axis robot according to example embodiments.

FIG. 2 is a flowchart illustrating a method of teaching the 7-axis robot according to example embodiments.

Referring to FIG. 2, an arm end position corresponding to x, y, z, roll, pitch and yaw that represent a position and rotation angle of the end-effector of the robot is taught to the robot in step 20. In step 40, it is determined whether the arm end position has been completely taught. Upon completion of the arm end position teaching, the position of the arm end is fixed in step 60. Then an arm angle is taught to the robot in step 80 and it is determined whether the arm angle teaching has been completed in step 100. Upon completion of the arm angle teaching, parameters indicating the position of the arm end and the arm angle are stored in step 120. A playback operation is performed using these taught parameter values in IK, which will be described with reference to FIG. 3.

Figure 3:
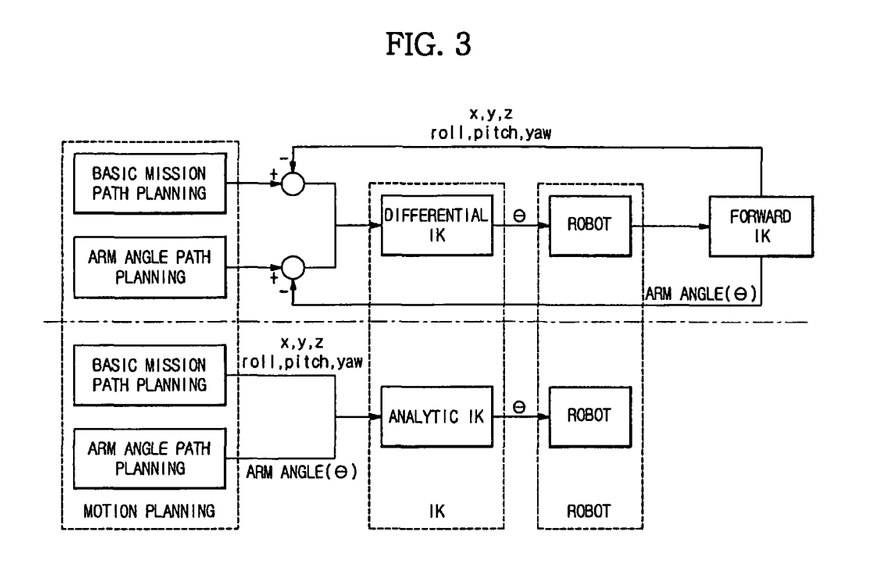
FIG. 3 illustrates teaching and playback for the 7-axis robot according to example embodiments.

FIG. 3 illustrates teaching and playback for a robot according to example embodiments. The robot may be a multi-joint robot having six or more axes. Hereinbelow, the robot is described as a 7-axis robot having one redundancy resolution.

As illustrated in FIG. 3, teaching and playback for the 7-axis robot is performed through differential IK and analytic IK according to example embodiments. Both the IKs involve robot motion planning and robot operation, based on a redundancy resolution parameter. Now a description will be made of a control flow including a motion planning stage, an IK stage, and a robot stage.

The motion planning stage includes planning the end-effector parameters x, y, z, roll, pitch and yaw and the redundancy resolution parameter, i.e. arm angle over all motions. The redundancy resolution parameter, namely the arm angle is an angle between a reference plane and an arm plane. A reference vector $\hat{V}$ is variably set according to the joint structure of a shoulder of the robot, as described later in detail with reference to FIG. 4. Considering a robot with an elbow having an offset, the center of a fourth axis is used, instead of the point of intersection between third and fifth axes, for positioning an elbow of the robot. As this reference plane and the arm angle are stored, a posture of the robot may be uniquely represented in any area in which the arm angle is defined. This is used as a method of teaching a redundancy resolution.

The IK stage is divided into differential IK and analytic IK, for example, according to control methods for a 7-axis manipulator. The IK stage involves calculation for each joint of the robot of a target joint value, an angular speed, an angular acceleration, torque, etc. using target values obtained from the motion planning. For differential IK-based redundancy resolution control, a cost function of the difference between a current arm angle and a target arm angle is used. The differential IK-based redundancy resolution control includes control of a redundancy resolution through null-space control or Extended Jacobian. On the other hand, analytic IK involves calculation of joint values corresponding to the end-effector parameters including x, y, z, roll, pitch and yaw, and the redundancy resolution parameter consisting arm angle, either geometrically or algebraically. To be more specific, the analytic IK includes a method of interpreting and applying the redundancy resolution and a method of determining a solution from among a plurality of joint values. In particular, the analytic IK includes a method of interpreting an elbow offset manipulator and applying an arm angle, which will be described later in detail.

The robot stage involves actual operation of the robot by motors in response to input of the calculated target values, and output of feedback values by an encoder.

Figure 4:
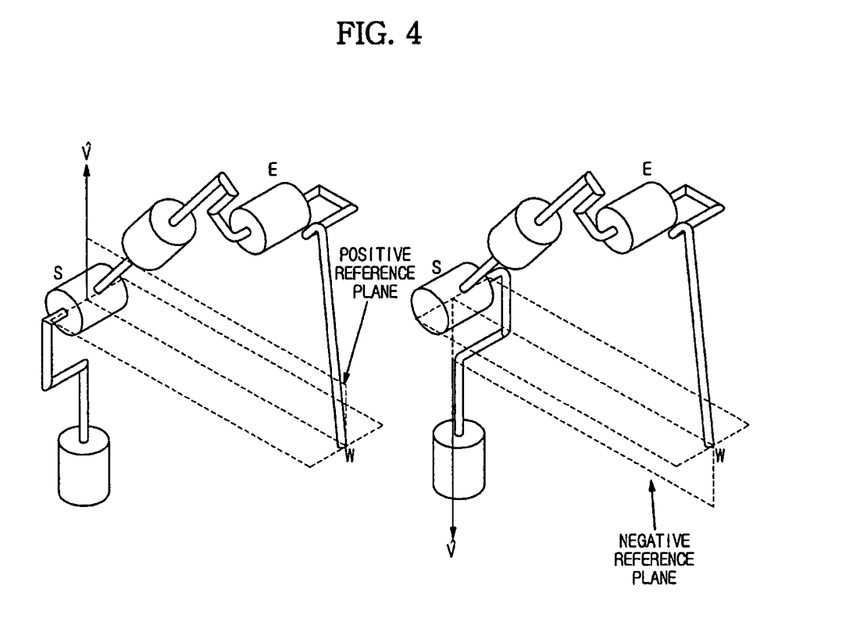
FIG. 4 illustrates a redundancy resolution parameter based on a joint structure of the 7-axis robot according to example embodiments.
Figure 5:
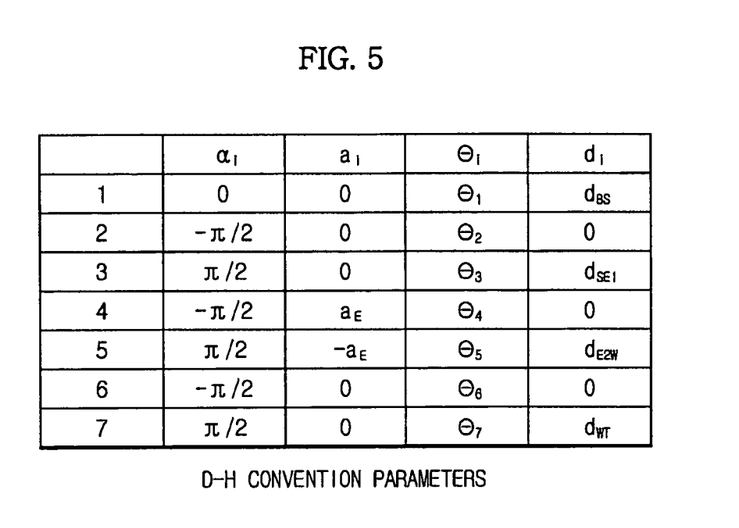
FIG. 5 is a table listing Denavit-Hartenberg (D-H) convention parameters for teaching and playback for the 7-axis robot according to example embodiments.

FIG. 4 illustrates a redundancy resolution parameter based on a joint structure of the 7-axis robot according to example embodiments, and FIG. 5 is a table listing Denavit-Hartenberg (D-H) convention parameters for teaching and playback for the 7-axis robot according to example embodiments. With reference to FIGS. 4 and 5, the teaching and playback method for a robot according to the example embodiments will be described in the context of a 7-axis elbow offset manipulator. The following provides detail regarding the use of forward IK to calculate an arm angle.

For teaching and playback of the 7-axis elbow offset manipulator, the D-H convention parameters illustrated in FIG. 5 are used and values a and d are arbitrarily selected.

The redundancy resolution parameter (arm angle, ψ) is defined as follows. The redundancy resolution parameter includes a sign and a value. The sign represents a reference plane to be used, and the value represents an angle with respect to the reference plane. According to signs, positive and negative reference planes exist as illustrated in FIG. 4. Postures of a robot corresponding to the positive and negative reference planes are referred to as positive and negative postures, respectively. All postures that can be assumed with respect to an arm plane are divided into two types.

If $0 \leq \theta_S < \pi$, positive posture (+)

else negative posture (−)

where $\theta_S$ is an angle between a second joint axis and a vector $V_{SW}$ directed from the shoulder to the wrist, projected to the X-Y plane of a first coordinate system based on the D-H convention parameters. The above posture classification is available when each of the remaining axes except for the fourth axis is in a rotation range of 180 to 360 degrees. If the fourth axis rotates 180 degrees or more, four types of postures are defined. A fixed vector $\hat{V}$ is determined as follows to determine a reference plane based on the determined posture.

If positive posture (+), $\hat{V} = u_{SW} \times u_{2z}$ else negative posture (−), $\hat{V} = u_{2z} \times u_{SW}$ where $u_{SW}$ is a unit vector of $V_{SW}$ and $u_{2z}$ is an axial-direction (z-axis direction) unit vector of the second joint axis.

The reference plane is generated using the determined fixed vector $\hat{V}$ and $\overline{SW}$ and an arm plane and a rotation angle are calculated, to calculate an arm angle. Both the arm angle and the type of the reference plane may be represented by one parameter by setting the range of the arm angle to be 0 to 360 degrees and assigning a sign to the arm angle according to the reference plane. Also, information about the reference plane may be stored as another parameter.

The application of the above values to IK will be described below. First, the following Jacobian is calculated in differential IK.

$$J_\psi = \dot{\psi}/\dot{\theta}$$

The above Jacobian is applied to a null-space controller or Extended or Augmented Jacobian, thereby making the manipulator move by a fine displacement and finally reach the target posture. For example, the following equation describes application of the Jacobian to the null-space controller during a speed level control $$\dot{\theta} = J^+\dot{x} + [J_\psi(I-J^+J)]^+(\dot{\psi} - J_\psi J^+ \dot{x})$$

Figure 6:
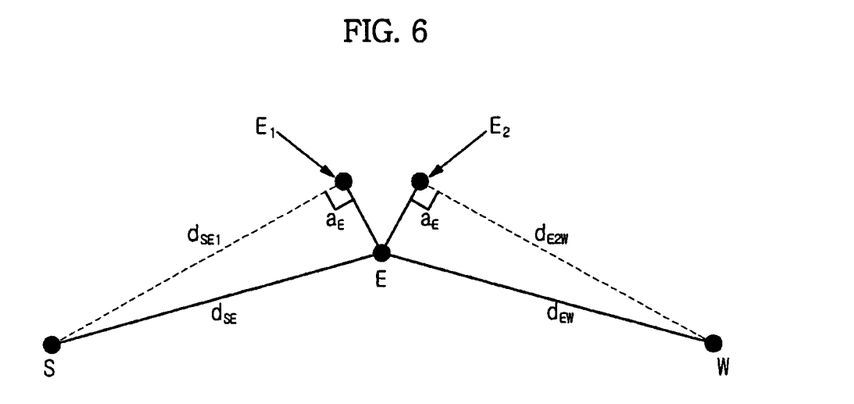
FIG. 6 illustrates a method of setting an elbow of the 7-axis robot having an elbow offset and a virtual elbow according to example embodiments.

Analytic IK is divided into two parts, initial posture analysis and target posture analysis. An initial posture is a posture of the robot when ψ=0 and an elbow is defined for analysis as illustrated in FIG. 6. FIG. 6 illustrates a method of setting an elbow of the 7-axis robot having an elbow offset and a virtual elbow according to example embodiments. Conventional analytic IK designates the point of intersection of the central lines of the third and fifth axes as an elbow, whereas the center of the fourth axis is set as an elbow in real implementation.

Two virtual elbow joints $E_1$ and $E_2$ are formed based on the D-H convention parameters. $E_1$ is a point apart from the shoulder by a distance $d_{SE1}$ in the direction of the rotation axis of the third axis and $E_2$ is a point apart from the wrist by a distance $-d_{SE1}$ in the direction of the rotation central axis of the fifth axis. By setting the parameter a from the shoulder and the wrist to 0 in the D-H convention parameter table, $$^3l_{SE_1} = [0\,0\,d_{SE_1}]^T$$

$$^3l_{E_2W} = [0\,0\,d_{E_2W}]^T$$

Also, a base of the robot and the manipulator is in the following relationship.

$$^0l_{BS} = [0\ \ 0\ \ d_{BS}]^T$$

$$^7l_{WT} = [0\ \ 0\ \ d_{WT}]^T$$

$$d_{SE} = \sqrt{d_{SE_1}^2 + a_E^2}$$

$$d_{EW} = \sqrt{d_{E_2W}^2 + a_E^2}$$

$$\theta_{\angle E_1 SE} = A\tan(a_E/d_{SE_1})$$

$$\theta_{\angle E_2 WE} = A\tan(a_E/d_{E_2S})$$

$$\theta_{\text{offset}} = \theta_{\angle E_1 SE} + \theta_{\angle E_2 WE}$$

$$^{i-1}R_i = \begin{bmatrix} \cos\theta_i & -\sin\theta_i\cos\alpha_i & \sin\theta_i\sin\alpha_i \\ \sin\theta_i & \cos\theta_i\cos\alpha_i & -\cos\theta_i\sin\alpha_i \\ 0 & \sin\alpha_i & \cos\alpha_i \end{bmatrix}$$

The initial posture with ψ=0 is analyzed as follows. First, $\theta^0_1$, $\theta^0_2$, $\theta^0_3$ and $\theta^0_4$ representing the initial posture of the robot are defined. $\theta^0_i$ represents the value of an $i^{th}$ joint for the initial posture. Unless the poise of the end-effector is changed, the position of the wrist is always the same. Hence, $\theta_4$ is constant irrespective of ψ. That is, $\theta_4 = \theta^0_4$, which is calculated geometrically by $$\theta^0_4 = \pi - \theta_{\angle SEW} + \theta_{\text{offset}}$$

$$\theta_{\angle SEW} = \pi - a\cos\left(\frac{\|V_{SW}\|^2 - d_{SE}^2 - d_{EW}^2}{2d_{SE}d_{EW}}\right)$$

$$V_{SW} = {^0x_7} - {^0l_{BS}} - {^0R_7}\,{^7l_{WT}}$$

Then $\theta_\alpha$ is defined as $\angle ESW$ and $\theta_\beta$ is defined as an angle between $u_{1z}$ and $V_{SW}$.

$$\theta_\alpha = a\sin\left(\frac{d_{EW}\sin(\pi-\theta_{\angle SEW})}{d_{SW}}\right)$$

$$\theta_\beta = A\tan 2(u_{1x} \circ V_{SW}, u_{1z} \circ V_{SW})$$

From the above equations, other joint angles are calculated by $$\theta_1^0 = A\tan 2(-u_x^0 \times u_{2z}, u_y^0 \times u_{2z})$$

$$\theta_2^0 = \theta_\beta - \theta_\alpha - \theta_{\angle E_1 SE}$$

$$\theta_3^0 = 0$$

According to the reference plane and the reference vector, $u_{2z}$ is geometrically determined by the following equation.

$$u_{2z} = \hat{V} \times V_{SW}$$

$\theta_1$ is calculated and selected according to the positive or negative posture as described in relation to the arm angle definition. $\theta_{2,3}$ is calculated by a geometrical analysis between $V_{SW}$ and a link and $\theta_3$ is always 0 when ψ=0.

Now, a detailed description will be made of analysis of the target posture. The target posture analysis includes calculating a posture of the manipulator having an arm angle changed by ψ with respect to the initial posture. The target posture analysis is carried out by analyzing three parts, that is, the elbow, the shoulder and the wrist.

The elbow analysis is made geometrically. Because $\theta_4$ is independent of $\psi$ as stated before, $\theta_4$ is given as $$\theta_4 = \pi - \theta_{\angle SEW} + \theta_{offset}$$

The shoulder is analyzed as follows. When $\psi=0$, the direction of the elbow is known from $\theta^0{}_1$, $\theta^0{}_2$, $\theta^0{}_3$ and $\theta^0{}_4$. Hence, a target elbow direction is derived by $$^0R_4 = {}^0R_{n\psi} {}^0R_4{}^0$$

$$^0R_4{}^0 = (^0R_1|_{\theta_1{}^0})(^0R_2|_{\theta_2{}^0})(^0R_3|_{\theta_3{}^0})(^0R_4|_{\theta_4{}^0})$$

$$^0R_{n\psi} = I_3 + \sin\psi [n\times] + (1-\cos\psi)[n\times]^2$$

where $^0R^0{}_4$ is a rotation matrix from the base to the coordinates of the fourth axis when $\psi=0$, and $^0R^0{}_{n\psi}$ is a rotation matrix obtained by using the Rodriques's formula with respect to the reference axis $V_{SW}$ and the arm angle $\psi$. The following equation is derived from the above equations.

$$^0R_3 = {}^0R_{n\psi} {}^0R_3{}^0$$

If $\theta_S$ is a set of $\theta_1$, $\theta_2$ and $\theta_3$, $^0R_3$ and a rotation matrix $R(\theta_S)$ are expressed as $$^0R_3 = \begin{bmatrix} s_{11} & s_{12} & s_{13} \\ s_{21} & s_{22} & s_{23} \\ s_{31} & s_{32} & s_{33} \end{bmatrix}$$

$$R(\theta_3) = {}^0R_1(\theta_1) \cdot {}^1R_2(\theta_2) \cdot {}^2R_3(\theta_3) = \begin{bmatrix} \cdots & \cdots & c_{\theta_1} s_{\theta_2} \\ \cdots & \cdots & s_{\theta_1} s_{\theta_2} \\ -s_{\theta_2} c_{\theta_3} & s_{\theta_2} s_{\theta_3} & c_{\theta_2} \end{bmatrix}$$

where $s_e$ and $c_e$ are short for $\sin\theta$ and $\cos\theta$. Using the above two equations, shoulder joint values are computed by $$\theta_1 = A\tan 2(s_{23}, s_{13})$$

$$\theta_2 = A\tan 2(\sqrt{s_{13}{}^2 + s_{23}{}^2}, s_{33})$$

$$\theta_3 = A\tan 2(s_{32}, -s_{31})$$

where $s_{ij}$ is a component of the matrix $^0R_3$ and the matrix $^0R_3$ is valid when $s_{13}$ and $s_{23}$ are not zeros. Aside from the above equations, other possible solutions are given as $$\theta_1 = A\tan 2(-s_{23}, -s_{13})$$

$$\theta_2 = A\tan 2(-\sqrt{s_{13}{}^2 + s_{23}{}^2}, s_{33})$$

$$\theta_3 = A\tan 2(-s_{32}, -s_{31})$$

In other words, one of the two sets of solutions is selected by determining whether the robot's posture is positive or negative.

Regarding the wrist analysis, the relationship between a fifth joint and a sixth joint is calculated by analyzing target wrist joint angles by $$^{4'}R_7 = {}^{4'}R_4{}^T {}^0R_4{}^T {}^0R_7$$

where $^0R_{4'}$ is a rotation offset between the fourth axis and the fifth axis, $^0R^T{}_4$ is a value mathematically calculated by IV-B.1 and IV-B.2, and $^0R_7$ is a direction of the end-effector. The wrist is similar to the shoulder in structure. Therefore, if $\theta_W$ is a set of $\theta_5$, $\theta_6$ and $\theta_7$, the following equations are derived according to the foregoing analysis.

$$^{4'}R_7 = \begin{bmatrix} w_{11} & w_{12} & w_{13} \\ w_{21} & w_{22} & w_{23} \\ w_{31} & w_{32} & w_{33} \end{bmatrix}$$

$$R(\theta_w) = {}^4R_5(\theta_5) \cdot {}^5R_6(\theta_6) \cdot {}^6R_7(\theta_7) = \begin{bmatrix} \cdots & \cdots & c_{\theta_5} s_{\theta_6} \\ \cdots & \cdots & s_{\theta_5} s_{\theta_6} \\ -s_{\theta_6} c_{\theta_7} & s_{\theta_6} s_{\theta_7} & c_{\theta_6} \end{bmatrix}$$

Based on the above equations, the following joint angle solutions are obtained.

$$\theta_5 = A\tan 2(w_{23}, w_{13}) \quad \theta_5 = A\tan 2(-w_{23}, -w_{13})$$

$$\theta_6 = A\tan 2(\sqrt{w_{13}{}^2 + w_{23}{}^2}, w_{33}) \text{ or } \theta_6 = A\tan 2(-\sqrt{w_{13}{}^2 w_{23}{}^2}, w_{33})$$

$$\theta_7 = A\tan 2(w_{32}, -w_{31}) \quad \theta_7 = A\tan 2(-w_{32}, -w_{31})$$

where $w_{ij}$ is a component of the matrix $^0R_7$ and the matrix $^0R_7$ is valid when $w_{13}$ and $w_{23}$ are not zeros. As stated before in relation to the shoulder analysis, one of the two sets of solutions may be selected. However, if there is no reference value for the wrist, a solution most similar to the wrist posture of the manipulator is selected.

The above method is summarized as follows. The respective equations are used to derive the values of the first, second and third axes and the values of the fifth, sixth and seventh axes by comparing algebraic equations with analytic equations. $_{i-1}R_i$ represents rotation from an $(i-1)^{th}$ coordinate system to an $i^{th}$ coordinate system, $_0Rn\psi$ represents a Rodrigues rotation with respect to $V_{SW}$, $_4R_{4'}$ represents an offset between a fourth coordinate system and a fifth coordinate system.

$$^0R_3 = {}^0R_{n\phi} {}^0R_3{}^0$$

$$^{4'}R_7 = {}^{4'}R_4{}^T {}^0R_4{}^T {}^0R_7$$

Since the position of the wrist is always constant unless the poise of the end-effector is changed, $\theta_4$ is constant irrespective of $\psi$. Therefore, $\theta_4$ is equal to $\theta_4$ of the initial posture. When a plurality of solutions are derived for the shoulder, a solution is selected according to a posture sign, and when a plurality of solutions are derived for the wrist, a solution most similar to the current structure is selected.

As is apparent from the above description, the teaching and playback method based on control of a redundancy resolution for a robot according to example embodiments eliminates the uncertainty of teaching and playback for a multi-joint robot. In particular, the teaching and playback method is provided by applying analytic IK to an S-A-S robot with an elbow having an offset.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A teaching and playback method for a robot, comprising:
    performing by a processor a teaching and playback operation based on inverse kinematics for the robot, for posture control in operational space, by calculating joint angles of the robot in joint space using end-effector parameters and a redundancy resolution parameter of the robot,
    wherein the redundancy resolution parameter is determined in conjunction with a joint structure of the robot and the redundancy resolution parameter is an arm angle which is an angle between a set reference plane and an arm plane formed by a shoulder, elbow and wrist of the robot.

2. The teaching and playback method according to claim 1, wherein the robot has an offset in an elbow.

3. The teaching and playback method according to claim 1, further comprising determining whether a posture of the robot is one of positive and negative by comparing a set angle with an angle θS between a second joint axis of the robot and a vector obtained by projecting a vector directed from the shoulder to the wrist of the robot on an X-Y plane of a first joint coordinate system based on Denavit-Hartenberg (D-H) convention parameters.

4. The teaching and playback method according to claim 3, wherein the posture determination comprises determining that the posture of the robot is positive, if the angle θS is between 0 and 180 degrees and determining that the posture of the robot is negative, if the angle θS is below 0 or above 180 degrees.

5. The teaching and playback method according to claim 3, wherein the reference plane is one of a positive reference plane and a negative reference plane according to the posture of the robot, the positive reference plane is generated to be a plane formed by the shoulder and wrist of the robot and a first reference vector which is a cross product between the vector directed from the shoulder to the wrist of the robot and an axial-direction vector of the second joint axis of the robot, when the posture of the robot is positive, and the negative reference plane is generated to be a plane formed by the shoulder and wrist of the robot and a second reference vector which is a cross product between the axial-direction vector of the second joint axis of the robot and the vector directed from the shoulder to the wrist of the robot, when the posture of the robot is negative.

6. The teaching and playback method according to claim 5, wherein the arm angle and a type of the reference plane are represented in one parameter by setting the arm angle to range from 0 to 360 degrees and assigning a sign indicating one of the positive and negative reference plane.

7. The teaching and playback method according to claim 5, wherein information indicating whether the reference plane is one of the positive and negative plane is stored as a parameter.

8. The teaching and playback method according to claim 1, wherein the inverse kinematics is differential inverse kinematics.

9. The teaching and playback method according to claim 1, wherein the inverse kinematics is analytic inverse kinematics.

10. The teaching and playback method according to claim 9, wherein the teaching and playback operation comprises:
    setting a center of a fourth axis of the robot as an elbow;
    generating two virtual elbows based on Denavit-Hartenberg (D-H) convention parameters; and
    interpreting an initial posture of the robot and a target posture that results from moving the arm plane by a predetermined angle, using the elbow and the virtual elbows.

11. A teaching and playback method for a robot having an elbow with an offset, comprising:
    performing a teaching and playback operation based on analytic inverse kinetics for the robot for posture control, using end-effector parameters and a redundancy resolution parameter of the robot,
    wherein the teaching and playback operation includes:
    setting a center of a fourth axis of the robot as an elbow;
    generating two virtual elbows based on Denavit-Hartenberg (D-H) convention parameters; and
    interpreting an initial posture of the robot and a target posture that results from moving a set reference plane and an arm plane defined by a shoulder, elbow, and wrist of the robot by a predetermined angle, using the elbow and the virtual elbows.

12. The teaching and playback method according to claim 11, wherein the redundancy resolution parameter is determined in conjunction with a joint structure of the robot.

13. The teaching and playback method according to claim 12, wherein the redundancy resolution parameter is an arm angle which is an angle between the set reference plane and the arm plane.

14. At least one computer readable medium comprising computer readable instructions that control at least one processor to implement the method of claim 11.

* * * * *

UNITED STATES PATENT AND TRADEMARK OFFICE
CERTIFICATE OF CORRECTION

Page 1 of 1

PATENT NO. : 8,560,122 B2
APPLICATION NO. : 12/923650
DATED : October 15, 2013
INVENTOR(S) : Dae Hyung Park et al.

It is certified that error appears in the above-identified patent and that said Letters Patent is hereby corrected as shown below:

In the Claims

In Column 9, Line 37, In Claim 3, delete "θS" and insert -- $\theta_S$ --, therefor.
In Column 9, Line 44, In Claim 4, delete "θS" and insert -- $\theta_S$ --, therefor.
In Column 9, Line 46, In Claim 4, delete "θS" and insert -- $\theta_S$ --, therefor.

Signed and Sealed this
Eighteenth Day of February, 2014

Michelle K. Lee
*Deputy Director of the United States Patent and Trademark Office*